United States Patent
Cavage et al.

(10) Patent No.: US 8,775,485 B1
(45) Date of Patent: Jul. 8, 2014

(54) OBJECT STORE MANAGEMENT OPERATIONS WITHIN COMPUTE-CENTRIC OBJECT STORES

(71) Applicants: Mark Cavage, Seattle, WA (US); Nathan Fitch, Seattle, WA (US); Fred Kuo, Seattle, WA (US); Yunong Xiao, Seattle, WA (US); David Pacheco, San Francisco, CA (US); Bryan Cantrill, Piedmont, CA (US)

(72) Inventors: Mark Cavage, Seattle, WA (US); Nathan Fitch, Seattle, WA (US); Fred Kuo, Seattle, WA (US); Yunong Xiao, Seattle, WA (US); David Pacheco, San Francisco, CA (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/836,599

(22) Filed: Mar. 15, 2013

(51) Int. Cl.
*G06F 17/30* (2006.01)

(52) U.S. Cl.
USPC ........... 707/813; 707/821; 707/758; 707/736; 707/722; 707/713

(58) Field of Classification Search
USPC .......................... 707/713, 722, 736, 758, 821
See application file for complete search history.

(56) References Cited

U.S. PATENT DOCUMENTS

| | | | |
|---|---|---|---|
| 6,393,495 B1 | 5/2002 | Flory et al. | |
| 6,553,391 B1 | 4/2003 | Goldring et al. | |
| 6,901,594 B1 | 5/2005 | Cain et al. | |
| 7,222,345 B2 | 5/2007 | Gray et al. | |
| 7,265,754 B2 | 9/2007 | Brauss | |
| 7,379,994 B2 | 5/2008 | Collazo | |
| 7,437,730 B2 | 10/2008 | Goyal | |
| 7,529,780 B1 | 5/2009 | Braginsky et al. | |
| 7,581,219 B2 | 8/2009 | Neiger et al. | |
| 7,603,671 B2 | 10/2009 | Liu | |
| 7,640,547 B2 | 12/2009 | Neiman et al. | |
| 7,685,148 B2 | 3/2010 | Engquist et al. | |
| 7,774,457 B1 | 8/2010 | Talwar et al. | |
| 7,814,465 B2 | 10/2010 | Liu | |
| 7,849,111 B2 * | 12/2010 | Huffman et al. | 707/813 |
| 7,899,901 B1 | 3/2011 | Njemanze et al. | |
| 7,904,540 B2 | 3/2011 | Hadad et al. | |
| 7,917,599 B1 | 3/2011 | Gopalan et al. | |
| 7,933,870 B1 | 4/2011 | Webster | |
| 7,940,271 B2 | 5/2011 | Wright et al. | |
| 8,006,079 B2 | 8/2011 | Goodson et al. | |

(Continued)

FOREIGN PATENT DOCUMENTS

| | | |
|---|---|---|
| WO | 2011/088224 | 7/2011 |
| WO | WO2012125143 | 9/2012 |
| WO | WO2012125144 | 9/2012 |

OTHER PUBLICATIONS

International Search Report, May 19, 2011, PCT/US2011/028234,Mar. 11, 2011.

(Continued)

*Primary Examiner* — Sana Al Hashemi
(74) *Attorney, Agent, or Firm* — Carr & Ferrell LLP

(57) ABSTRACT

Object store management operations within compute-centric object stores are provided herein. An exemplary method may include transforming an object storage dump into an object store table by a table generator container, wherein the object storage dump includes at least objects within an object store that are marked for deletion, transmitting records for objects from the object store table to reducer containers, such that each reducer container receives object records for at least one object, the object records comprising all object records for the at least one object, generating a set of cleanup tasks by the reducer containers, and executing the cleanup tasks by a cleanup agents.

10 Claims, 9 Drawing Sheets

(56) References Cited

U.S. PATENT DOCUMENTS

| | | | |
|---|---|---|---|
| 8,010,498 B2 | 8/2011 | Gounares et al. |
| 8,141,090 B1 | 3/2012 | Graupner et al. |
| 8,181,182 B1 | 5/2012 | Martin |
| 8,301,746 B2 | 10/2012 | Head et al. |
| 8,336,051 B2 | 12/2012 | Gokulakannan |
| 8,346,935 B2 | 1/2013 | Mayo et al. |
| 8,370,936 B2 | 2/2013 | Zuk et al. |
| 8,417,673 B2 | 4/2013 | Stakutis et al. |
| 8,417,746 B1 | 4/2013 | Gillett, Jr. et al. |
| 8,429,282 B1 | 4/2013 | Ahuja et al. |
| 8,434,081 B2 | 4/2013 | Cervantes et al. |
| 8,464,251 B2 | 6/2013 | Sahita et al. |
| 8,468,251 B1 | 6/2013 | Pijewski et al. |
| 8,547,379 B2 | 10/2013 | Pacheco et al. |
| 8,555,276 B2 | 10/2013 | Hoffman et al. |
| 8,631,131 B2 | 1/2014 | Kenneth et al. |
| 8,677,359 B1 | 3/2014 | Cavage et al. |
| 2002/0069356 A1 | 6/2002 | Kim |
| 2002/0082856 A1 | 6/2002 | Gray et al. |
| 2002/0156767 A1 | 10/2002 | Costa et al. |
| 2002/0198995 A1 | 12/2002 | Liu et al. |
| 2003/0154112 A1 | 8/2003 | Neiman et al. |
| 2003/0163596 A1 | 8/2003 | Halter et al. |
| 2004/0088293 A1 | 5/2004 | Daggett |
| 2005/0097514 A1* | 5/2005 | Nuss ........................ 717/114 |
| 2005/0108712 A1 | 5/2005 | Goyal |
| 2005/0188075 A1 | 8/2005 | Dias et al. |
| 2006/0107087 A1 | 5/2006 | Sieroka et al. |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0248294 A1 | 11/2006 | Nedved et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1 | 8/2007 | Croft et al. |
| 2007/0250838 A1 | 10/2007 | Belady et al. |
| 2007/0271570 A1 | 11/2007 | Brown et al. |
| 2008/0080396 A1 | 4/2008 | Meijer et al. |
| 2008/0103861 A1 | 5/2008 | Zhong |
| 2008/0155110 A1 | 6/2008 | Morris |
| 2009/0044188 A1 | 2/2009 | Kanai et al. |
| 2009/0077235 A1 | 3/2009 | Podila |
| 2009/0164990 A1 | 6/2009 | Ben-Yehuda et al. |
| 2009/0172051 A1* | 7/2009 | Huffman et al. ............ 707/206 |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1 | 10/2009 | Beaty et al. |
| 2009/0300210 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0114825 A1 | 5/2010 | Siddegowda |
| 2010/0125845 A1 | 5/2010 | Sugumar et al. |
| 2010/0131324 A1 | 5/2010 | Ferris |
| 2010/0131854 A1 | 5/2010 | Little |
| 2010/0153958 A1 | 6/2010 | Richards et al. |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0228936 A1 | 9/2010 | Wright et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0268764 A1 | 10/2010 | Wee et al. |
| 2010/0299313 A1 | 11/2010 | Orsini et al. |
| 2010/0306765 A1 | 12/2010 | DeHaan |
| 2010/0306767 A1 | 12/2010 | Dehaan |
| 2010/0318609 A1 | 12/2010 | Lahiri et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 | 2/2011 | Arasaratnam |
| 2011/0047315 A1 | 2/2011 | De Dinechin et al. |
| 2011/0055396 A1 | 3/2011 | DeHaan |
| 2011/0055398 A1 | 3/2011 | Dehaan et al. |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1 | 7/2011 | Mayo et al. |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0302378 A1* | 12/2011 | Siebert ........................ 711/155 |
| 2011/0302583 A1 | 12/2011 | Abadi et al. |
| 2011/0320520 A1 | 12/2011 | Jain |
| 2012/0017210 A1 | 1/2012 | Huggins et al. |
| 2012/0054742 A1 | 3/2012 | Eremenko et al. |
| 2012/0060172 A1 | 3/2012 | Abouzour |
| 2012/0066682 A1 | 3/2012 | Al-Aziz et al. |
| 2012/0079480 A1 | 3/2012 | Liu |
| 2012/0089980 A1 | 4/2012 | Sharp et al. |
| 2012/0124211 A1 | 5/2012 | Kampas et al. |
| 2012/0131156 A1 | 5/2012 | Brandt et al. |
| 2012/0131591 A1 | 5/2012 | Moorthi et al. |
| 2012/0159507 A1 | 6/2012 | Kwon et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0185913 A1 | 7/2012 | Martinez et al. |
| 2012/0198442 A1 | 8/2012 | Kashyap et al. |
| 2012/0204176 A1 | 8/2012 | Tian et al. |
| 2012/0221845 A1 | 8/2012 | Ferris |
| 2012/0233315 A1 | 9/2012 | Hoffman et al. |
| 2012/0233626 A1 | 9/2012 | Hoffman et al. |
| 2012/0246517 A1 | 9/2012 | Bender et al. |
| 2012/0266231 A1 | 10/2012 | Spiers et al. |
| 2012/0284714 A1 | 11/2012 | Venkitachalam et al. |
| 2012/0303773 A1 | 11/2012 | Rodrigues |
| 2012/0311012 A1 | 12/2012 | Mazhar et al. |
| 2013/0042115 A1 | 2/2013 | Sweet et al. |
| 2013/0060946 A1 | 3/2013 | Kenneth et al. |
| 2013/0067067 A1 | 3/2013 | Miri et al. |
| 2013/0081016 A1 | 3/2013 | Saito et al. |
| 2013/0086590 A1 | 4/2013 | Morris et al. |
| 2013/0129068 A1 | 5/2013 | Lawson et al. |
| 2013/0132057 A1 | 5/2013 | Deng et al. |
| 2013/0169666 A1 | 7/2013 | Pacheco et al. |
| 2013/0173803 A1 | 7/2013 | Pijewski et al. |
| 2013/0179881 A1 | 7/2013 | Calder et al. |
| 2013/0191835 A1 | 7/2013 | Araki; Takuya |
| 2013/0191836 A1 | 7/2013 | Meyer |
| 2013/0254407 A1 | 9/2013 | Pijewski et al. |
| 2013/0318525 A1 | 11/2013 | Palanisamy et al. |
| 2013/0328909 A1 | 12/2013 | Pacheco et al. |
| 2013/0339966 A1 | 12/2013 | Meng et al. |
| 2013/0346974 A1 | 12/2013 | Hoffman et al. |

OTHER PUBLICATIONS

Non-Final Office Action, Dec. 10, 2012, U.S. Appl. No. 13/046,647, Mar. 11, 2011.

International Search Report, May 5, 2011, PCT/US2011/028230, Mar. 11, 2011.

Notice of Allowance, Aug. 20, 2012, U.S. Appl. No. 12/696,802, Jan. 29, 2010.

Non-Final Office Action, Mar. 27, 2012, U.S. Appl. No. 12/696,802, Jan. 29, 2010.

(56) References Cited

OTHER PUBLICATIONS

Non-Final Office Action, Mar. 2, 2011, U.S. Appl. No. 12/696,619, Jan. 29, 2010.
Final Office Action, Jul. 11, 2011, U.S. Appl. No. 12/696,619, Jan. 29, 2010.
Non-Final Office Action, May 29, 2012, U.S. Appl. No. 12/696,619, Jan. 29, 2010.
Non-Final Office Action, Sep. 6, 2011, U.S. Appl. No. 12/696,334, Jan. 29, 2010.
Final Office Action, Jul. 6, 2012, U.S. Appl. No. 12/696,334, Jan. 29, 2010.
International Search Report, Sep. 1, 2011, PCT/US2011/021157, Jan. 13, 2011.
Non-Final Office Action, Apr. 12, 2012, U.S. Appl. No. 13/340,461, Dec. 29, 2011.
Final Office Action, Nov. 19, 2012, U.S. Appl. No. 13/340,461, Dec. 29, 2011.
Notice of Allowance, Feb. 8, 2013, U.S. Appl. No. 13/340,461, Dec. 29, 2011.
Non-Final Office Action, Mar. 20, 2012, U.S. Appl. No. 13/340,488, Dec. 29, 2011.
Final Office Action, Aug. 15, 2012, U.S. Appl. No. 13/340,488, Dec. 29, 2011.
Notice of Allowance, May 23, 2013, U.S. Appl. No. 13/340,488, Dec. 29, 2011.
Notice of Allowance, Jun. 3, 2013, U.S. Appl. No. 13/046,647, Mar. 11, 2011.
Non-Final Office Action, Jul. 29, 2013, U.S. Appl. No. 13/829,250, Mar. 14, 2013.
Non-Final Office Action, Jul. 29, 2013, U.S. Appl. No. 13/899,543, May 21, 2013.
Non-Final Office Action, Aug. 12, 2013, U.S. Appl. No. 13/046,660, Mar. 11, 2011.
International Search Report, Sep. 26, 2013, PCT/US2011/028230, Mar. 12, 2011.
Final Office Action, Nov. 26, 2013, U.S. Appl. No. 13/829,250, Mar. 14, 2013.
Office Action, Oct. 22, 2013, U.S. Appl. No. 13/835,865, Mar. 15, 2013.
Notice of Allowance, Nov. 19, 2013, U.S. Appl. No. 13/831,386, Mar. 14, 2013.
Non-Final Office Action, Sep. 9, 2013, U.S. Appl. No. 13/831,349, Mar. 14, 2013.
Non-Final Office Action, Oct. 4, 2013, U.S. Appl. No. 13/831,292, Mar. 14, 2013.
Non-Final Office Action, Sep. 10, 2013, U.S. Appl. No. 13/838,150, Mar. 15, 2013.
Non-Final Office Action, Sep. 13, 2013, U.S. Appl. No. 13/830,913, Mar. 14, 2013.
Final Office Action, Dec. 5, 2013, U.S. Appl. No. 13/899,543, May 21, 2013.
Non-Final Office Action, Oct. 4, 2013, U.S. Appl. No. 13/963,964, Aug. 9, 2013.
Non-Final Office Action, Nov. 13, 2013, U.S. Appl. No. 13/963,980, Aug. 9, 2013.
Yagoubi, Belabbas et al., "Load Balancing in Grid Computing," Asian Journal of Information Technology, vol. 5, No. 10, pp. 1095-1103, 2006.
Kramer, "Advanced Message Queuing Protocol (AMQP)," Linux Journal, Nov. 2009, p. 1-3.
Subramoni et al., "Design and Evaluation of Benchmarks for Financial Applications Using Advanced Message Queuing Protocol (AMQP) over InfiniBand," Nov. 2008.
Richardson et al., "Introduction to RabbitMQ," Sep. 2008, p. 1-33.
Bernstein et al., "Using XMPP as a Transport in Intercloud Protocols," Jun. 22, 2010, p. 1-8.
Bernstein et al., "Blueprint for the Intercloud—Protocols and Formats for Cloud Computing Interoperabiilty," May 28, 2009, p. 328-336.
Gregg, Brendan, "Visualizing System Latency," May 1, 2010, ACM Queue, p. 1-13, http://queue.acm.org/detail.cfm?id=1809426.
Gregg, Brendan, "Heat Map Analytics," Mar. 17, 2009, Oracle, p. 1-7, https://blogs.oracle.com/brendan/entry/heat_map_analytics.
Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.
Bi et al. "Dynamic Provisioning Modeling for Virtualized Multi-tier Applications in Cloud Data Center". 2010 IEEE 3rd International Conference on Cloud Computing. pp. 370-377.
Chappell, David. "Introducing Windows Azure". Microsoft Corporation. Oct. 2010. pp. 1-25.
Bill Pijewski's Blog. Retrieved Mar. 12, 2014 from http://dtrace.org/blogs/wdp/2011/03/our-zfs-io-throttle/.
Brendan's Blog. Retrieved Mar. 12, 2014 from http://dtrace.org/blogs/brendan/2011/03/08/busy-week-zfs-throttling-dtrace-node-js-and-cloud-analytics/.
Joyent ZFS Performance Analysis and Tools. Retrieved Mar. 12, 2014 from http://www.slideshare.net/brendangregg/zfsperftools2012.
Block 10 Controller. Retrieved Mar. 12, 2014 from https://www.kernel.org/doc/Documentation/cgroups/blkio-controller.txt.
Block Device Bio Throttling Support. Retrieved Mar. 12, 2014 from https://lwn.net/Articles/403889/.
Gregg, Brendan. Systems Performance: Enterprise and the Cloud, Prentice Hall, 2014, pp. 557-558.
Final Office Action, mailed Jan. 16, 2014, U.S. Appl. No. 13/838,150.
Chef Documents. Retrieved Mar. 11, 2014 from http://docs.opscode.com/.
Ansible Documentation. Retrieved Mar. 11, 2014 from http://docs.ansible.com/.
Mesnier, Michael. I/O throttling. 2006. Retrieved Apr. 13, 2014 from https://www.usenix.org/legacy/event/fast07/tech/full_papers/mesnier/mesnier_html/node5.html.

* cited by examiner

OBJECT STORE MANAGEMENT
OPERATIONS WITHIN COMPUTE-CENTRIC
OBJECT STORES

FIELD OF THE PRESENT TECHNOLOGY

The present technology relates generally to the execution of object store management operations within a compute-centric object store. The present technology leverages compute operations within a compute-centric object store to facilitate management operations such as garbage collection, resource metering, and so forth.

BACKGROUND

Various methods and systems for providing multitenant computing systems, such as cloud computing, have been attempted. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Management operations within these systems comprise, for example, garbage collection, where the system cleans up object stores by deleting, consolidating, or otherwise processing user deleted data. Garbage collection may include deleting or updating dependencies between objects, namely objects that were deleted by users that were formerly associated with other objects in the object store. Other management operations comprise usage metering, where the system generates reports that are indicative of system resource utilization. These reports may be generated to provide system administrators with empirical data regarding object store usage, even down to the user level. Unfortunately, object storage systems that utilize these management functions often leverage third party tools, which are not specifically designed for the object store itself. Thus, administrators may struggle with compatibility issues and other similar drawbacks.

SUMMARY OF THE PRESENT TECHNOLOGY

According to some embodiments, the present technology may be directed to methods that comprise: (a) transforming an object storage dump into an object store table by a table generator container, wherein the object storage dump includes at least objects within an object store that are marked for deletion; (b) transmitting records for objects from the object store table to reducer containers, such that each reducer container receives object records for at least one object, the object records comprising all object records for the at least one object; (c) generating a set of cleanup tasks by the reducer containers; and (d) executing the cleanup tasks by a cleanup agents.

According to some embodiments, the present technology may be directed to systems that comprise: (a) one or more processors; and (b) logic encoded in one or more tangible media for execution by the one or more processors, the logic comprising: (i) a table generator container that transforms an object storage dump into an object store table, wherein the object storage dump includes at least objects within an object store that are marked for deletion; (ii) a set of reducer containers that: receive records for objects from the object store table from the table generator, such that each reducer container receives object records for at least one object, the object records comprising all object records for the at least one object; (iii) generate a set of cleanup tasks; and (iv) cleanup agents that execute the cleanup tasks.

According to some embodiments, the present technology may be directed to methods that comprise: (a) partitioning raw usage records by a map phase container; (b) grouping the partitioned records by user, type, and an identifier via a first set of reducer containers; (c) deduplicating the grouped usage records via a second set of reducer containers; (d) aggregating the deduplicated usage records for a user for a namespace into namespace records via the second set of reducer containers; and (e) summing namespace records for each namespace associated with the user into a usage report via a third set of reducer containers.

According to some embodiments, the present technology may be directed to systems that comprise: (a) one or more processors; and (b) logic encoded in one or more tangible media for execution by the one or more processors, the logic comprising: (i) a map phase container that partitions raw usage records; (ii) a first set of reducer containers that groups partitioned records by user, type, and an identifier; (iii) a second set of reducer containers that deduplicate the grouped usage records; (iv) the second set of reducer containers aggregating the deduplicated usage records for a user for a namespace into namespace records; and (iv) a third set of reducer containers that each sum the namespace records for each namespace associated with a user into usage reports.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
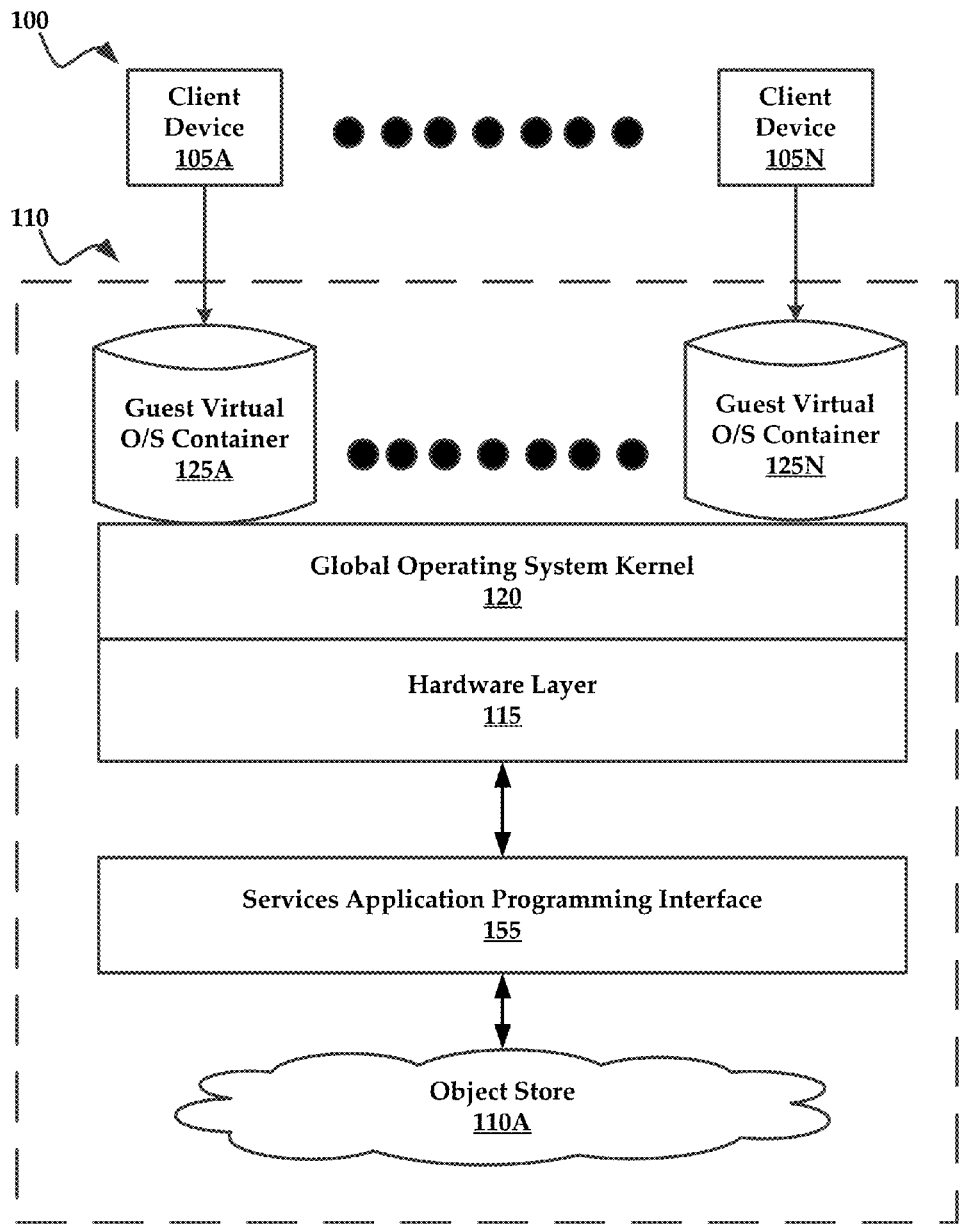
FIG. 1 is a block diagram of an exemplary architecture in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 is a block diagram of an exemplary architecture 100 in which embodiments of the present technology may be practiced. The architecture 100 comprises a plurality of client devices 105A-N that communicatively couple with a compute-centric object store system, hereinafter "system 110." It will be understood that the architecture 100 may include a plurality of systems, such as system 110. For the sake of brevity and clarity, a detailed description of an exemplary system 110 will be provided below, although the features of the system 110 apply equally to all of the plurality of systems. The plurality of client devices 105A-N may communicatively couple with the system 110 via any one or combination of a number of private and/or public networks, such as the Internet. According to some embodiments, the client devices 105A-N may submit requests or jobs to a network service 110B, which is a constituent part of the system 110. In some instances, the network service 110E evaluates request received from users to determine one or more physical nodes that comprise objects that correspond to the request.

In general, the system 110 comprises an object store 110A that provides "compute" as a first class citizen of an object store 110A. More specifically, compute operations (e.g., instructing the system to compute on objects in the object store) of the present technology resemble a top-level API function, similar to processes like storing or fetching objects in the object store 110A.

It will be understood that the terms "object store" comprise a network service for storing unstructured, arbitrary-sized chunks of data (objects). It will be further understood that the object store may not support modifications to existing objects, but supports full object replacement operations, although systems that support both object modification and full object replacement operations may also utilize the features of the present technology to perform compute operations directly on (e.g., in-situ) objects within the object store.

In some embodiments, the system 110 may be configured to receive a request to perform a compute operation on at least a portion of an object store, from a first user. Again, the user may be associated with one of the client devices. The request identifies parameters of the compute operation as well as objects against which the compute operation is executed.

In some instances, the system 110 may assign virtual operating system containers to a user, based upon a request. The system 110 may map objects to the containers that are associated with the user. Typically, these objects are identified by the user in the request. A virtual operating system container performs the compute operation on an object according to the identified parameters of the request. The system 110 may then clear the virtual operating system containers and return the virtual operating system containers to a pool of virtual operating system containers. Additional aspects of the system 110 will be described in greater detail below.

It will be understood that a compute-centric object store may be created to operate without the user of virtual operating system (global kernel) or virtual operating system containers. While such an object store would provide advantages such as in-situ computation of data (where objects are processed directly on the object store), the object store may not isolate tenants in the similarly to systems that utilize a virtual operating system and/or virtual operating system containers.

In these instances, the compute-centric object store may be configured to receiving a request to perform a compute operation on at least a portion of an object store from a first user via a network service, the request identifying parameters of the compute operation. The object store may also execute an operating system process for the objects identified in the request. The operating system process may perform the compute operation on the object according to the identified parameters of the request. Additionally, once the compute operation has been executed, the operating system process may be terminated by the virtual operating system.

The terms in-situ computation will be understood to include the execution of compute operations against objects in an object store, where the objects not moved or copied from or within the object store.

In some embodiments, the system 110 is comprised of a hardware layer 115 that provides a logical interface with at least one or more processors and a memory which stores logic that is executed by the one or more processors. Generally, the hardware layer 115 controls one or more of the hardware components of a computing system, such as the computing system 600 of FIG. 6, which will be described in greater detail below. By way of non-limiting example, the hardware layer 115 may manage the hardware components of a server blade or another similar device. The hardware layer 115 provides access to the physical hardware that services a global operating system kernel 120 that cooperates with the hardware layer 115. The global operating system kernel 120 may also be referred to as a host operating system kernel.

Generally, the global operating system kernel 120 is configured to administer and manage a pool of guest virtual operating system containers, such as containers 125A-N. The containers 125A-N may operate on a distributed object store in a multitenant manner, where multiple containers can operate on the same object store simultaneously. It will be understood that each user is assigned container from the pool, on an as-needed basis. When a container is applied to an object store the container is referred to as a tenant.

According to some embodiments, the system kernel 120 may be utilized to setup the pool of guest virtual operating system containers. The system kernel 120 may also be configured to provide a command line interpreter interface that allows users to request jobs, execute other operating system implemented applications, and interact with a virtual operating system in a manner that is substantially indistinguishable relative to an operating system executing on a bare metal device.

Generally, a job may be input by a user via a command line interpreter, such as a Unix shell terminal. More specifically, the user may express a computation using the same language as the language used by a Unix shell terminal. The actual request is submitted to the network service 110B. Indeed, a request may be submitted as an HTTP request to the network service 110B. The body of the request describes the computation to perform in terms of what commands are input into the command line interpreter, which is running within a container. Contrastingly systems that utilize multiple VMs that each comprises an operating system kernel, which are managed by a hypervisor, often require users to construct complex programs or scripts to perform compute operations. Compute operations for traditional VM systems require complex programming due to a complex framework that is used by the hypervisor to coordinate hardware emulation for each of the VMs.

Figure 3:
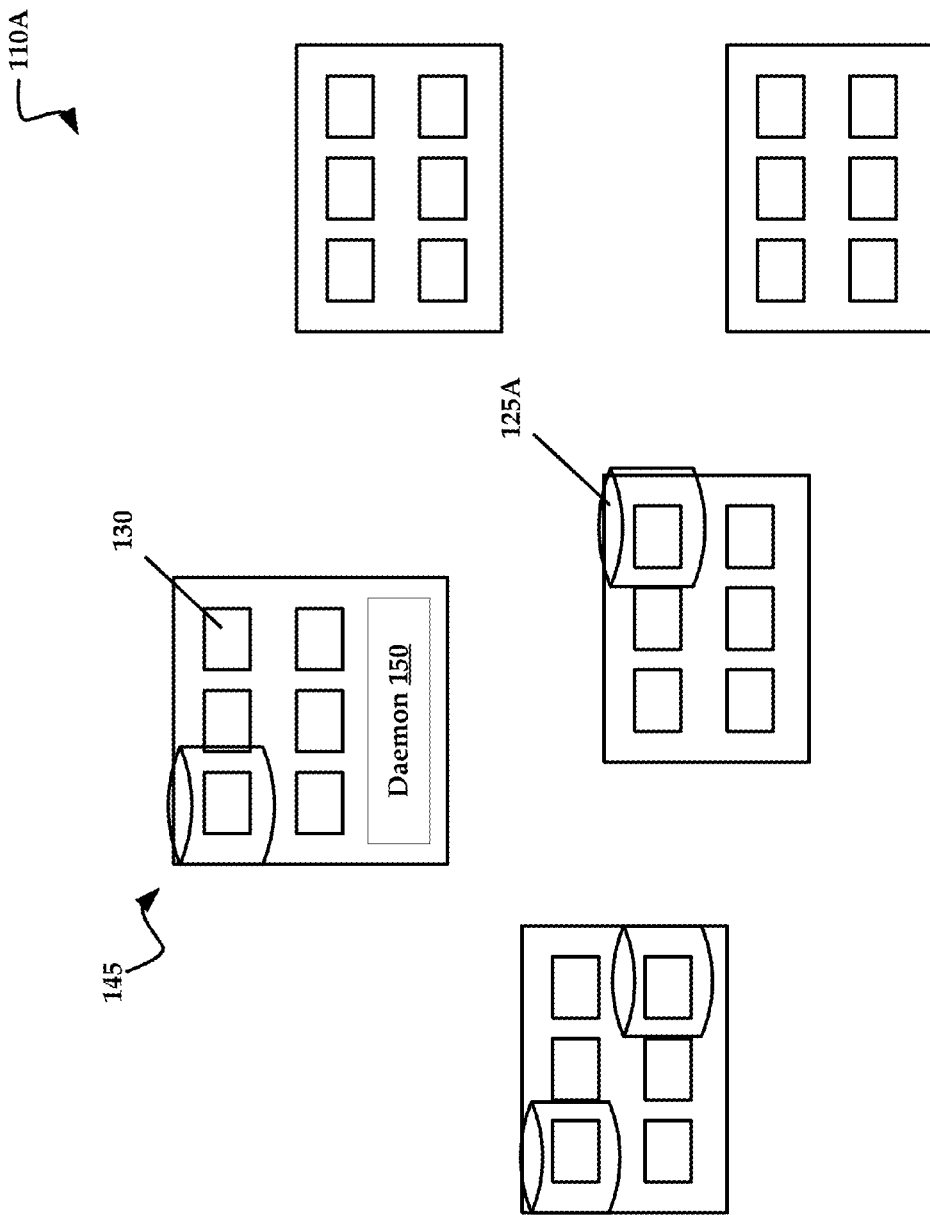
FIG. 3 is a schematic diagram illustrating the colocation of guest virtual operating system containers for multiple tenants on an object store.

Using the command line interpreter interface, the user may specify one or more desired compute operations that are to be executed against objects (such as object 130) within an object store 110A (see FIG. 3). It is noteworthy that the object store 110A may include, for example, a local or distributed object store that maintains contiguous blobs, blocks, or chunks of data. It will be understood that the objects stored in the object store 110A are complete objects, such as files or other similar data structures. Moreover, the compute operations executed against the object store 110A may be performed in such a way that partial stores of data are avoided.

In order to perform compute operations on objects for multiple users, the system kernel 120 may collocate containers 125A-N onto the object store 110A, and execute the containers 125A-N simultaneously. In FIG. 3, a plurality of containers, such as container 125A has been placed onto each of a plurality of objects within the object store 110A. Thus, a virtual operating system container is assigned to each of the plurality of objects specified in the user request. Most frequently, the assignment of a single container to a single object occurs when the system executes a "map" phase operation. The details of map and reduce phases provide by the system 110 will be described in greater detail below.

Broadly speaking, a virtual operating system container may be a lightweight virtualization solution offering a complete and secure user environment that operates on a single global kernel (system kernel 120), providing performance characteristics that are similar to operating systems that operate on bare metal devices. That is, a virtual machine operates on emulated hardware and is subject to control by a hypervisor, which produces computing inefficiencies. A virtual operating system container may operate without the computing inefficiencies of a typical virtual machine.

In some instances, the system kernel 120 may utilize a KVM (Kernel Virtual Machine) that improves the efficiency of the a virtual operating system, such as the global operating system kernel, by leveraging CPU virtualization extensions to eliminate a substantial majority of the binary translation (i.e., hardware emulation) that are frequently required by VMs.

Figure 2:
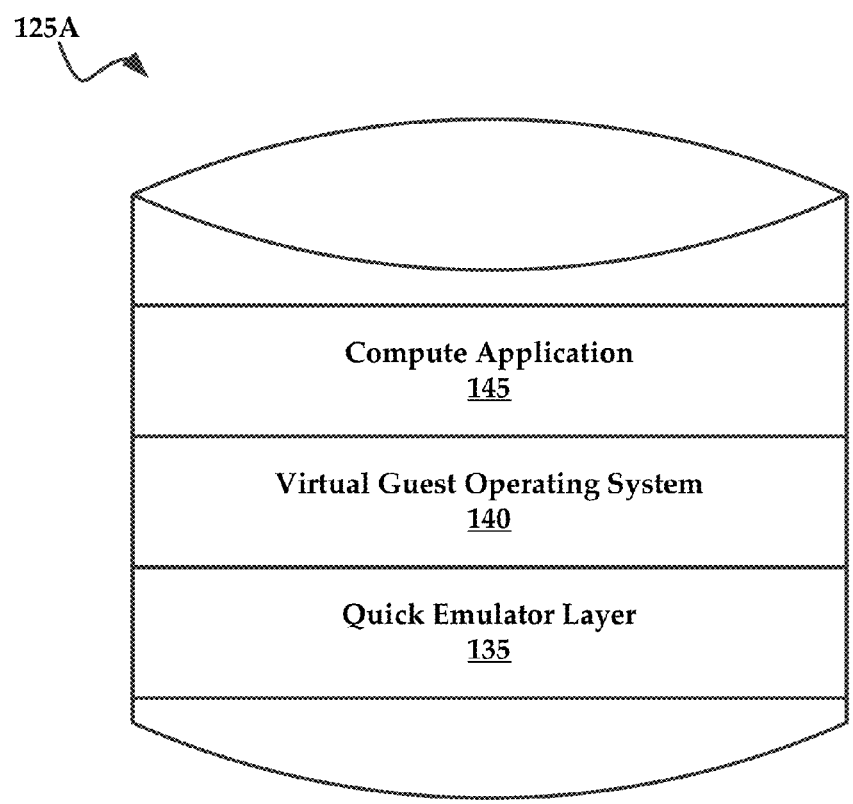
FIG. 2 is a schematic diagram of an exemplary guest virtual operating system container.

Turning to FIG. 2, an exemplary virtual operating system container 125A (FIG. 1) is shown as comprising a quick emulator layer (QEMU) 135, a virtual guest operating system 140, and a compute application 145 that is managed by the virtual guest operating system 140. The QEMU 135 provides hardware emulation and is also VMM (virtual machine monitor). It is noteworthy that in some embodiments the QEMU 135 is not a strict hypervisor layer, but rather each QEMU 135 may be independent in some exemplary embodiments. That is, there may be one QEMU 135 one per container instead of a single QEMU 135 supporting several VMs. Advantageously, the operations of both a VM and a VMM may be combined into the QEMU 135.

According to some embodiments, the compute application 145 that is executed may include a primitive O/S compute operation. Exemplary compute operations may include operating system primitive operations, such as query, word count, send, receive, and so forth. Additionally, the operations may comprise more sophisticated operations, such as operations that include audio or video transcoding. Additionally, in some instances, users may store programs or applications in the object store itself. Users may then execute the programs as a part of a compute operation.

In some instances the compute operations may include one or more phases such as a map phase, followed by a reduce phase. Generally, a map phase may include an operation that is executed against each of a plurality of objects individually, by a plurality of containers. In some instances, a unique container is assigned to each object that is to be processed.

In contrast, a reduce phase may be executed by a single container against a plurality of objects in a batch manner. Using an example such as word count, it will be assumed that the objects of the object store 110A may comprise text files. The compute application 145 may execute a map phase to count the words in each of the text files. The output of the compute application 145 may be stored in a plurality of output objects that are stored in the object store 110A. A compute application 145 of another container may execute a reduce phase that sums the output objects of the map phase and generates a word count for all objects within the object store 110A.

It will be understood that the system kernel 120 may schedule and coordinate various compute operations (and phases) performed by the compute applications 145 of all containers. In sum, the system kernel 120 may act similarly to a hypervisor that manages the compute operations of the various active containers. Based upon the request input by the user, the system kernel 120 may instruct the containers to perform a series of map functions, as well as a reduce functions. The map and reduce functions may be coordinated to produce the desired output specified in the request.

Turning to FIG. 3, after receiving a request from a user, the system kernel 120 may select a first set of containers, which includes container 125A from the pool of containers. This container 125A is assigned to a user. In response to receiving a request from a second user, the system kernel 120 may also select a second set of containers from the pool of containers.

Based upon the request received from the first tenant, the system kernel 120 may map the first set of containers to a plurality of objects, such as object 130, stored in the object store 110A. Likewise, the system kernel 120 may map a second set of containers to a plurality of different objects stored in the object store 110A for the second user. The objects and containers for the first user may be referred to as a compute zone of the first user, while the objects mapped to the container 125N may be referred to as a compute zone of the second user. The maintenance of compute zones allows the system kernel 120 to provide multitenant access to the object store 110A, even when the first and second users are potentially adversarial. For example, the first and second users may be commercial competitors. For security, the system kernel 120 maintains compute zones in order to balkanize object storage and prevent access to objects of other users. Additionally, the balkanization of object storage also ensures fair distribution of resources between users.

It will be understood that the system kernel 120 may maintain as many containers and compute zones as allowed by the processor(s) of the hardware layer 115. Additionally, the system kernel 120 assigns a container to a user on an as-needed basis, meaning that containers may not be assigned permanently to a user, which would result in a monopolization of resources when the user is not performing compute operations.

Figure 4:
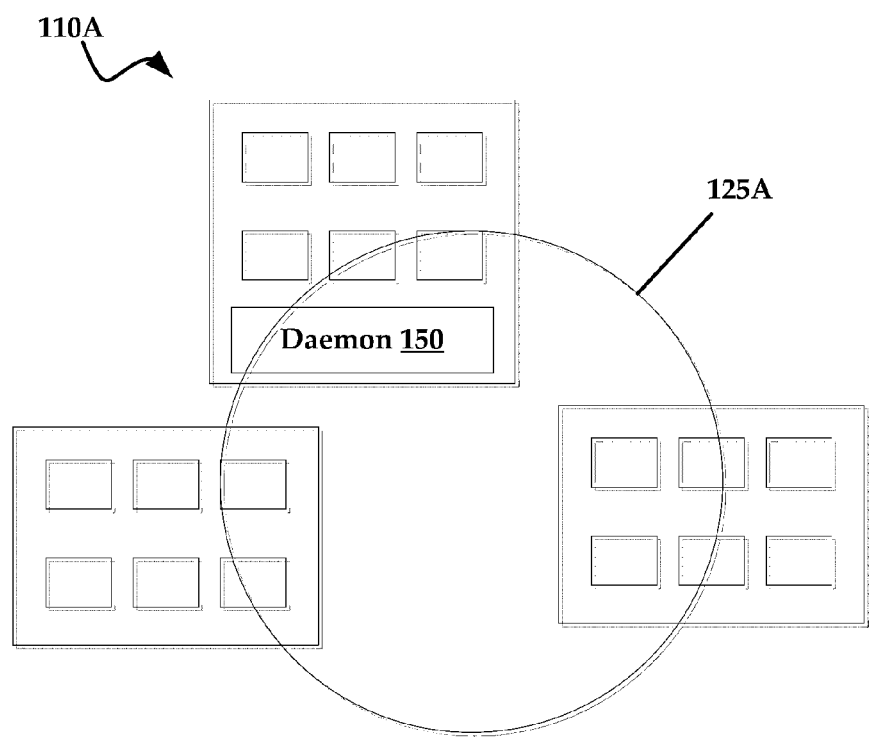
FIG. 4 is a schematic diagram of a guest virtual operating system container applied onto an object store.

FIG. 4 illustrates the placement of the container 125A onto the object store 110A. It is understood that the container 125A encircles a plurality of objects in the object store 110A. This mapping of multiple object to a single container would be commonly seen in a reduce phase, where the container is performing a concatenating or summation process on the outputs of individual containers, such as the containers shown in FIG. 3.

Additionally, because the container is placed onto the object store, the system kernel 120 need not transfer objects from the object store 110A into the container for processing in some exemplary embodiments. Advantageously, the container operates directly on the objects of the object store 110A.

According to some embodiments, the containers 125A-N managed by the system kernel 120 are empty when the containers 125A-N are in the pool. After objects are mapped to the container, compute operations may be executed by the container on the objects, and a desired output is generated, the system kernel 120 may clear the container and return the container to the pool.

In some instances, the system kernel 120 may not generate containers until a request is received from a user. That is, the system kernel 120 may "spin up" or launch containers when a request is received from the user. This allows for minimum impact to the bare metal resources, such as the CPU, as the system kernel 120 need not even maintain a pool of virtual operating system containers, which are awaiting user requests. That is, maintaining a pool of containers requires CPU and memory resources. When the compute operations have been completed, the system kernel 120 may terminate the containers, rather than clearing the containers and returning the containers to a pool.

In accordance with the present disclosure, an instruction set architecture may be implemented within the system 110. In some embodiments, the instruction set architecture may specify an application programming interface that allows the system 110 to interact with the distributed object store.

According to some embodiments, the system 110 communicatively couples with the object store 110A using a services related application programming interface (SAPI) 155, which provides features such as automatic discovery of object stores, dynamic configuration of object stores, and an API for a user portal. In sum, the SAPI allows users to configure, deploy, and upgrade applications using a set of loosely-coupled, federated services. In some embodiments, the SAPI may include an underlying API and an autoconfig agent, also referred to as a daemon 150. A SAPI client may also be disseminated to clients. It will be understood that the daemon 150 may be associated with a physical node 160 of the object store 110A.

In accordance with some embodiments according to the present disclosure, various object stores, such as object store 110A of FIGS. 3 and 4, comprise a single SAPI zone. It will be understood that the SAPI zone may be stateless and the SAPI zone may be configured to write objects into the object store 110A. In addition to storing objects, the SAPI zone may also communicatively couple with a VM API to provision zones and a network API (NAPI) to reserve network interface controllers (NIC) and lookup network universal unique identifiers (UUID).

It will be understood that the SAPI 155 may comprise three main object types such as applications, services, and instances. It is noteworthy that an application may comprise one or more services, and each service may comprise one or more instances. Moreover, instances may represent actual object store zones, and such zones inherit zone parameters and metadata from their associated applications and services.

Also, the application, service, and instance information may be used by the compute application of a virtual operating system container that is placed onto an object store. The daemon 150 may control the operation of the containers operating on the daemon's object store.

Each application, service and instance may include three sets of properties. For example, "params" may comprise zone parameters like a zone's RAM size, disk quota, image UUID, and so forth. These parameters are evaluated when a zone is provisioned. Another property comprises "metadata", which defines metadata available to the daemon 150. These metadata keys and values form the input of a script template in a configuration manifest (described below). As these values are updated, the daemon 150 may rewrite any configuration and make reference to changed metadata values. Yet another property comprises "manifests" that define a set of configuration manifests are indexed by name to facilitate inheriting manifest from parent objects.

It is noteworthy that creating applications and services have no effect on running zones. When an instance is created, a zone is provisioned using the above information from its associated application, service, and instance. Stated otherwise, applications and services (e.g., a job or request) may be defined separate from the objects that the applications and services are to be executed against. Thus, a job may be thought of abstractly as a workflow template. Advantageously, when the user requests the execution of a job, objects need only be defined by the user. The workflow template is then applied against the objects.

In some embodiments, the daemon 150 of a zone may be tasked with maintaining configuration inside that zone. The daemon 150 queries the SAPI 155 directly to determine which files to write and where to write them within the object store 110A.

The daemon 150 uses objects called configuration manifests; those objects describe the contents, location, and semantics of configuration files for a zone. Those manifests contain a script template which is rendered using the metadata from the associated application, service, and instance.

When a user provides a request to the system 110, the system kernel 120 may coordinate a compute flow of compute operations which are managed by the daemon 150. That is, the system kernel 120 may receive a request or "job" from a user, via a command line interpreter. The request identifies parameters of a compute operation that is to be executed against objects in a distributed object store. For example, a request may include performing a word count operation on a file.

To facilitate compute flow during the compute process, the system kernel 120 may assign an identifier for the request. This identifier provides a unique identifier that allows objects and outputs of compute operations to be correlated to the user. Objects previously stored in the object store may be correlated to the user utilizing a unique identifier. According to some embodiments, the identifier comprises the name of an input object or job name. This name may be specified by an end user submitting a job/request to the system or may be generated by the system from the request.

The user may also identify objects for the compute operation, using, for example, the command line interpreter. An exemplary find object command may include Find|User|Object Store Location; where the Object Store Location defines the object store that includes the object(s) which are necessary for execution of the compute operation.

In some instances, the system kernel 120 may query various daemons of object stores to locate the objects within the distributed object store. After the object have been located, the system kernel 120 may generate a set of tasks (e.g., an instruction set) that defines the various compute operations that are to be performed by the daemon of the located object store. In the example provided above, the set of tasks may include only one word count task that is provided to a single daemon of an object store (e.g., physical node). This relatively simple compute operation does not require coordination or scheduling of operations of multiple objects.

The daemon 150 may provide instructions to one or more virtual operating system containers that are placed onto the object store by the system kernel 120. That is, the instruction sets provided to the containers is based upon the task assigned to the daemon 150 from the system kernel 120.

In some instances, the set of tasks may include a more complex arrangement of operations that are executed against a plurality of objects stores. The system kernel 120 may interact with the daemon to coordinate processing of these objects in a specified order.

Additionally, the set of tasks may define various map phases that are to be executed on the objects of the object store, as well as various reduce phases that are executed on the outputs of the map phases. It will be understood that objects within the workflow may be tracked and correlated together using the identifier. For example, if an instruction set passed to a daemon requires performing a word count compute operation on 100 text files, each of the objects of the compute operation would be correlated using the identifier. Thus, the objects of the compute operation would comprise 100 objects that each includes a word count value for their corresponding text file. The identifier may be appended to the object as metadata.

It will also be understood that a map phase may result in multiple outputs, which are generated from a single input object. For example, assume that usage logs for a computing device are stored for a 24 hour time period. To determine hourly usage rates, the 24 hour log object may be separated into 24 distinct objects. Thus, the map phase may receive the 24 hour log object and may split the same into constituent output objects to complete the map phase.

It will be understood that a more complex request may require a more complicated set of tasks (e.g., phases). For example, if the user desires to look at all 11 p.m. to 12 p.m. user logs for a plurality of computing devices, the set of tasks may require not only the map task where a single input object is processed into multiple objects, but also a reduce phase that sums a plurality of 11 p.m. to 12 p.m. user logs for a plurality of devices.

In sum, the system kernel 120 will provide a daemon with tasks that include a map phase for generating the hour increment logs from various input objects. Additionally, the tasks also inform the daemon to return the output objects, which may be stored as an aggregate 11 p.m. to 12 p.m. log object within the object store.

It will be understood that the daemon of a physical node (e.g., object store) may control execution of compute operations by the one or more virtual operating system containers that are placed onto the object store via the system kernel 120.

Thus, it is appreciated with that intermediate output objects may not be output to the user directly, but may be fed back into the system for additional processing, such as with the map and reduce phases described above. Moreover, the set of tasks generated by the system kernel 120 may include any number of map phases and/or reduce phases, which vary according to the steps required to produce the desired output.

According to some embodiments, the system may leverage virtual operating system containers or compute zones to execute object store management functions within the compute-centric object store. Generally, these management functions comprise garbage collection, usage metering, and so forth. While many other management functions may be implemented, the following examples will further describe the execution of garbage collection and usage metering. One of ordinary skill in the art will appreciate that other object store management functions may also likewise be implemented using the frameworks described below, but configured to execute the desired function.

Broadly speaking, garbage collection refers to processes utilized to clean up an object store after a series of garbage creation events. A garbage creation event may include, for example, when a user deletes an object, or when a user overwrites an object that is linked to one or more dependent objects. Garbage created by these events may include the deleted object, as well as any orphan links created by the deletion, where an orphan link includes a link between the deleted object and one or more dependent objects.

The following definitions provide context for the following discussion. A storage node is a physical server that stores actual user data, and has at least one virtual operating system container pooled collocated with the storage node.

An internal metadata system is a place attributes about data ownership, sizes, free space, and so forth are stored. This internal metadata system is comprised of shards. These shards comprise data structures that have been partitioned in such a way that the system can add more partitions to the shared as the system grows.

Turning to the garbage collection process, it will be understood that each time a user uploads and subsequently deletes data within an object store; garbage is left over in the system in the form of files on storage nodes. If not dealt with, the system may generate enough garbage to cause the system to run out of room for new data within a short period of time.

As background, the system may utilize an indexing tier (e.g., authoritative store), which is an authoritative source that tracks which objects within the system of object stores and informs the system as to which objects are live. Objects are live, in the sense that the objects are accessible for retrieval through a system API (Application Programming Interface). Since the indexing tier is an authoritative store, the indexing tier is consulted to determine if a particular object should be collected. The indexing tier is actually composed of many shards, with each shard being responsible for a slice of one or more live objects. References for files in the storage node can exist on any of the shards. When an object is associated with multiple shards, each of the associated shards is consulted. Due to the nature of distributed systems, all shards cannot be consulted at the same instant in time. Due to this limitation, garbage collection is implemented as a job post-processing the set of shards.

Figure 5A:
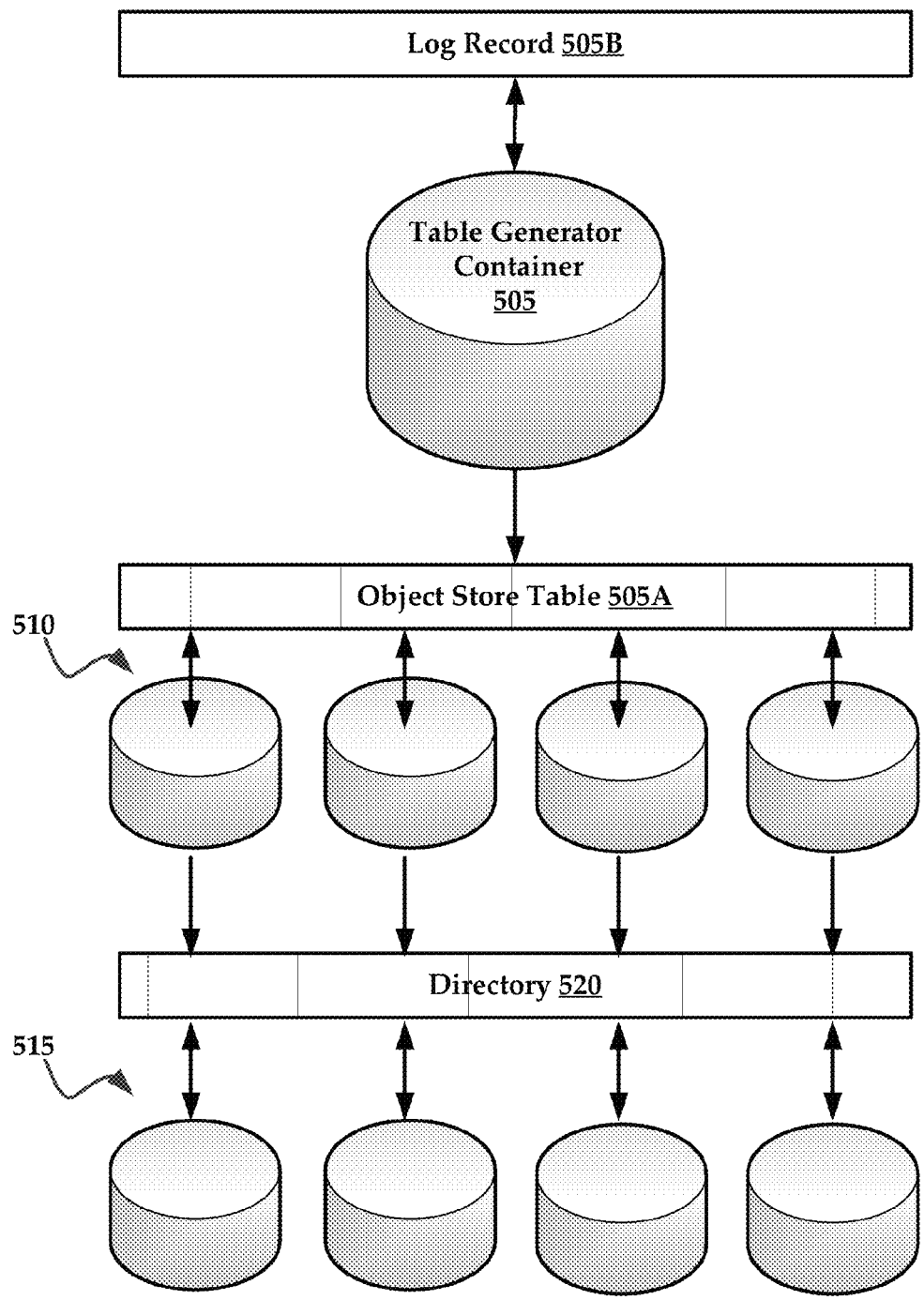
FIG. 5A illustrates an exemplary arrangement of virtual operating system containers that are utilized to facilitate an exemplary garbage collection process.

FIG. 5A illustrates an exemplary arrangement of virtual operating system containers that are utilized to facilitate an exemplary garbage collection process. A table generator container 505 is executed to transform an object storage dump into an object store table 505A. The object storage dump includes objects within the object store that have been marked for deletion. Objects marked for deletion may be indexed in a log record 505B stored on the object store. The first field in each record may include the object identifier; the second field is the time the record was produced.

The table generator container 505 may transmit records for each object to a set of reducers 510 in such a way that each reducer is provided all records for at least one given object. It will be understood that a reducer may receive all object records for a plurality of objects. The reducers sort the set of rows so that records for objects are grouped together and ordered by time. Each reducer may walk the history of an object (review records in chronological order) and decide if the object should be garbage collected. An object is garbage collected if the only record of that object is a deletion record that has passed a system wide grace period. In addition, deletion records are cleaned up if records for the object referenced in the deletion record have later records.

The output of the reducers 510 is a set of cleanup tasks for shards and object storage nodes. Cleanup tasks may then be processed by uploaded the tasks to a directory within the object store. Additionally, an operations file is uploaded with the set of commands to run to link the cleanup files into the correct locations for a set of crons. These commands may be uploaded to another specified task directory 520 within the object store.

Generally speaking, a cron is a basic Unix facility for executing arbitrary programs periodically (e.g., usually hourly, daily, weekly, etc.). A "cronjob" is process which is set up to run periodically with cron. Cronjobs may gather and upload a component's last hour's log files to the object store itself, both for long-term log storage or immediate processing using a compute component. In some instances, the crons include cleanup agents 515 that run within a compute zone. Specifically, the compute zone is referred to as a cleanup zone, when the cron is a cleanup agent.

Cleanup agents 515 will periodically look in a directory 520 where cleanup tasks are stored and the cleanup agents 515 will periodically execute the cleanup tasks. The cleanup agents 515 look for files in specified directories, downloads the files, and processes each line of the file to delete objects from the object store. The cleanup agents 515 execute within a cleanup zone so that it can reach out "directly" to each shard.

A cleanup agent will execute on each node and the cleanup agent will look for objects in a specified location on the node. The cleanup agent will then download the task for the object and processes each line of the object to delete object off the local disk.

Figure 5B:
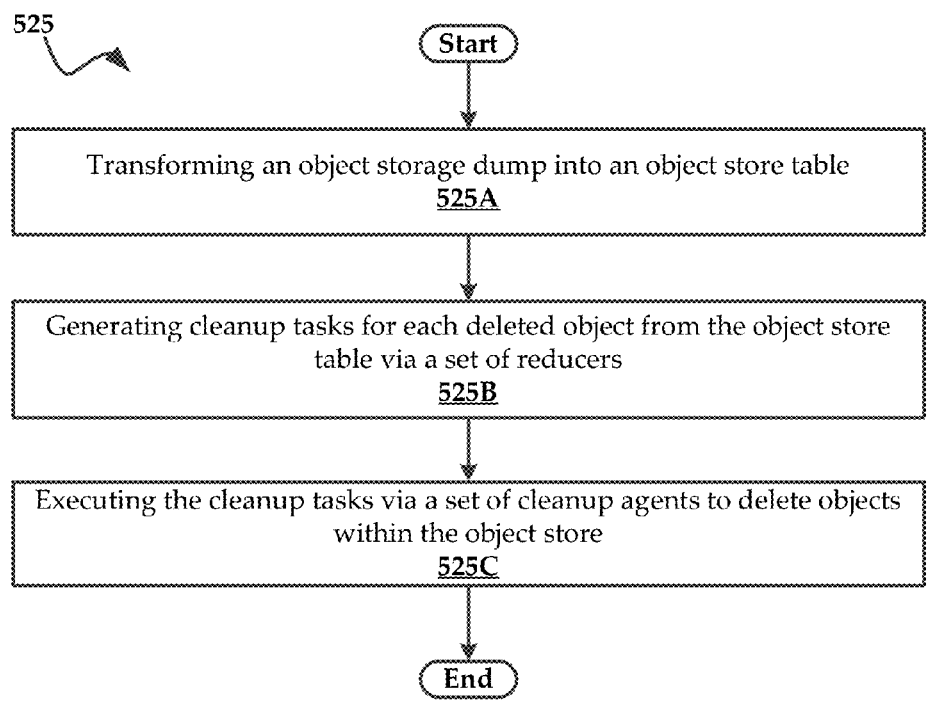
FIG. 5B is a flowchart of an exemplary process for garbage collection.

FIG. 5B is a flowchart of the method 525 executed by the arrangement of FIG. 5A. The method includes a step 525A of transforming an object storage dump into an object store table. The object storage dump includes objects within the object store that have been marked for deletion. Objects marked for deletion may be indexed in a log record stored on the object store.

Next the method may include a step 525B of generating cleanup tasks for each deleted object from the object store table via a set of reducers. Each deleted object may include a separate record within the object store table. Additionally, the method may include a step 525C of executing the cleanup tasks via a set of cleanup agents. A cleanup agent may be assigned for each deleted object. The cleanup agent processes the cleanup task for the object by evaluating each line of the object to delete the objects from the object store.

Figure 5C:
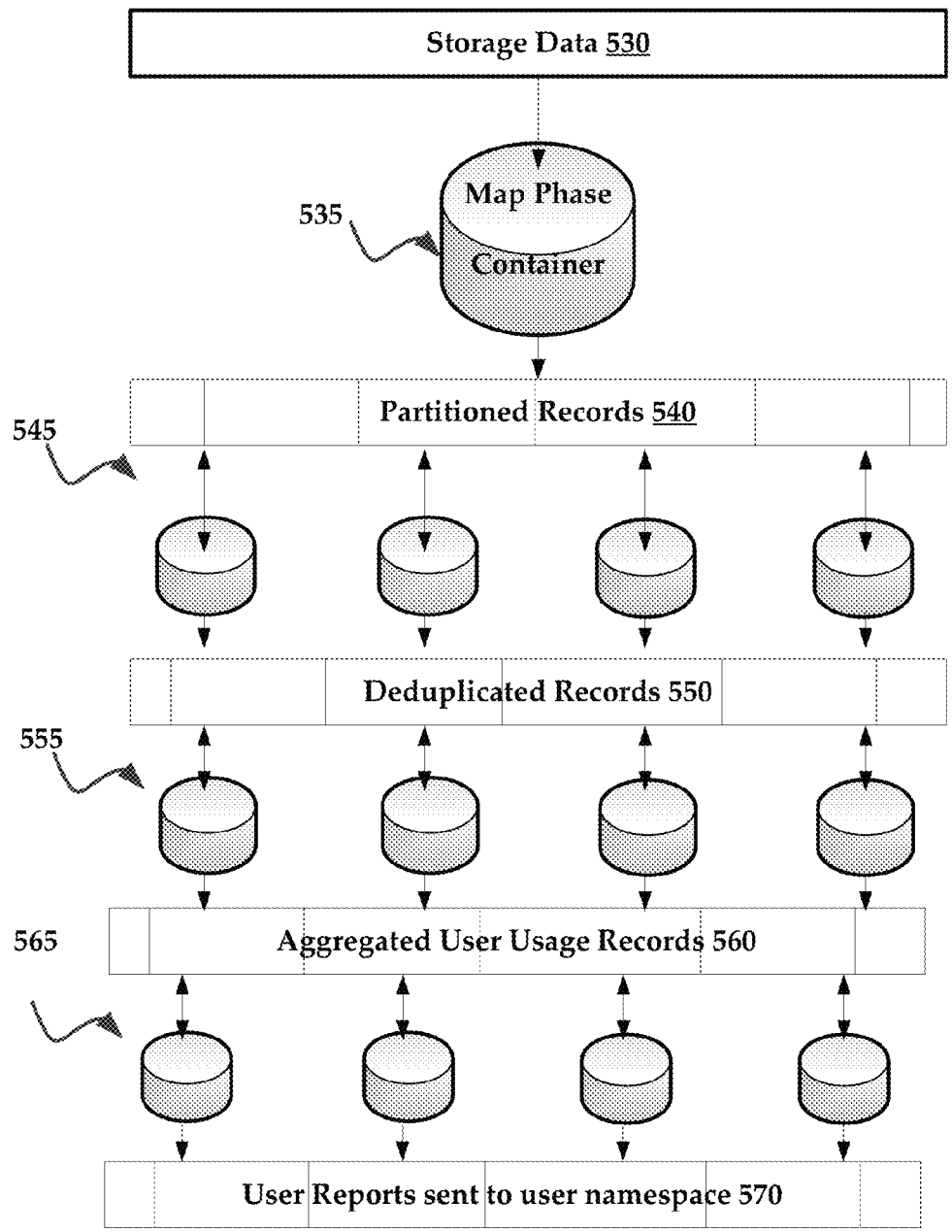
FIG. 5C illustrates an exemplary arrangement of virtual operating system containers that are utilized to facilitate an exemplary metering process.

FIG. 5C illustrates an exemplary arrangement of virtual operating system containers that are utilized to facilitate a metering process. Generally, metering reports are generated by running various jobs within the system. Daily reports are generated from hourly reports, and monthly reports may be generated from daily reports. There are three classes of usage that may be measured: (1) Storage: bytes stored on disk, number of keys, number of objects, and so forth; (2) Request: request totals by method, total transfer (bandwidth) in and out; (3) Compute: tasks that are executed by users.

With regard to storage, daily storage metering sums up the usage from every hour on the given calendar day, and monthly storage metering sums up the usage from every day on the given calendar month. This means daily and monthly storage metering represent unit-hours of usage (i.e., byte-hours, key-count-hours).

Storage hourly metering consists of a map phase and three reduce phases. Storage raw data 530 consists of dumps of data to each shard. The first line contains a table name and describes the schema for each entry.

The map phase container 535 takes extracts a '_value' field and emits it as output. These records are partitioned 540 and sent to a first set of reducer containers 545, grouped by owner, type, and objectId such that all identifiers that point to the same object for a single owner are collocated on a single reducer. Each reducer container 545 deduplicates any keys that point to the same object and aggregates usage per owner by namespace. ObjectIds are indexed in memory and any keys that point to the same object only increment a user's number of keys. The reducer containers 545 output deduplicated records 550.

The second set of reducer containers 555 sums up all of a user's usage for a single namespace. The output format is the same as the output format of the first reduce phase. Results are partitioned by owner. Cardinality of data is number of users multiplied by the number of namespaces. Once aggregation is finished, one aggregated record 560 is emitted per owner per namespace partitioned to that reducer.

The third set of reducer containers 565 combines a usage across different namespaces for a single user into a single record. If a user has no usage for a namespace, zero usage is added to the record for that namespace at this time. The third set of reducer containers 565 delivers reports 570 to each user's reports namespace.

Figure 5D:
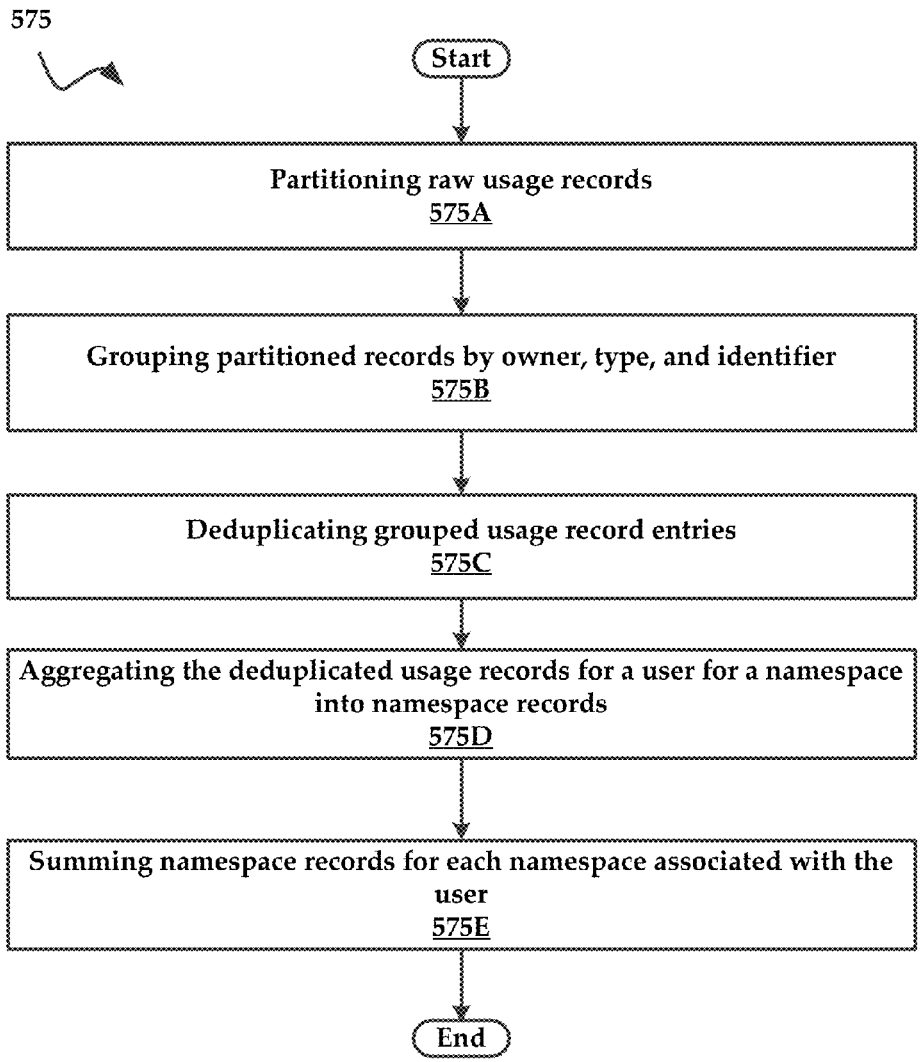
FIG. 5D is a flowchart of an exemplary process for metering.

FIG. 5D is a flowchart of a method for metering object store usage. The method 575 may include a step 575A of partitioning raw usage records and a step 575B of grouping partitioned records by owner, type, and identifier. The method may also include a step 575C of deduplicating grouped usage record entries. The method may include a step 575D of aggregating the deduplicated usage records for a user for a namespace into namespace records. The method also includes a step 575E of summing namespace records for each namespace associated with the user.

Figure 6:
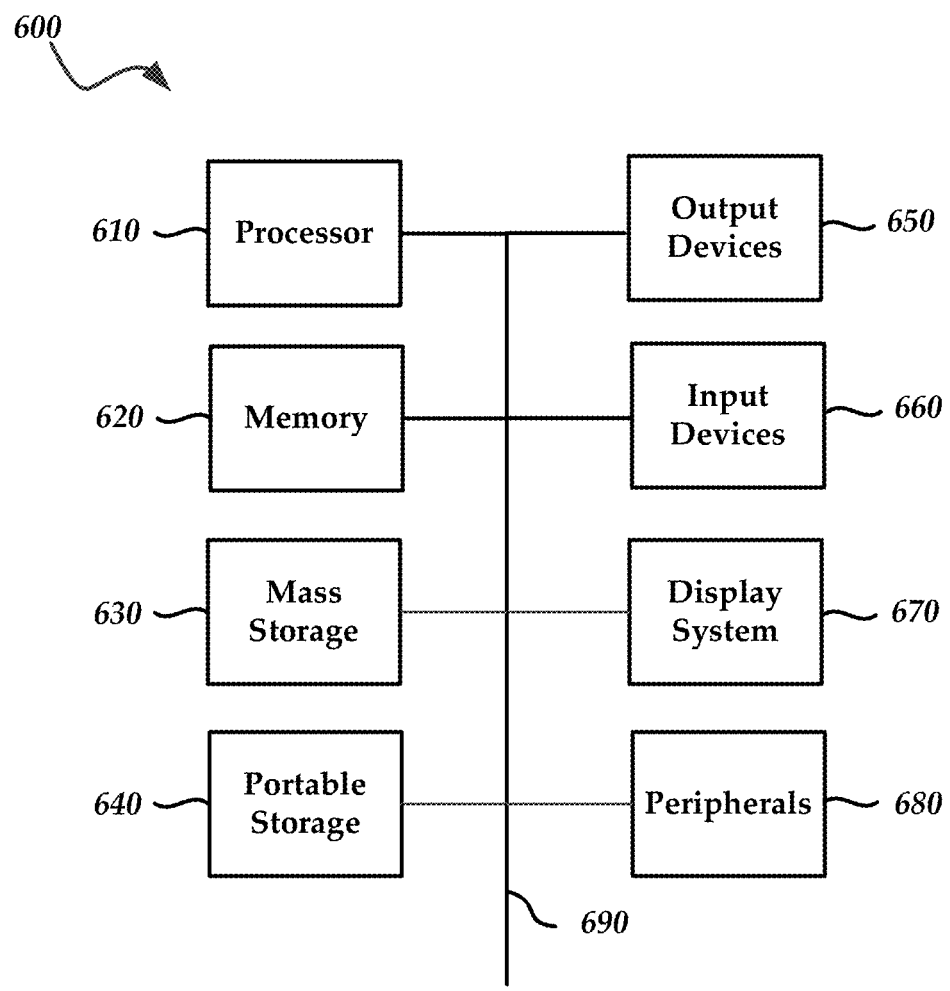
FIG. 6 illustrates an exemplary computing system that may be used to implement embodiments according to the present technology.

FIG. 6 illustrates an exemplary computing system 600 that may be used to implement an embodiment of the present systems and methods. The computing system 600 of FIG. 6 may be implemented in the contexts of the likes of computing systems, networks, servers, or combinations thereof. The computing system 600 of FIG. 6 includes one or more processors 610 and main memory 620. Main memory 620 stores, in part, instructions and data for execution by processor 610. Main memory 620 may store the executable code when in operation. The computing system 600 of FIG. 6 further includes a mass storage device 630, portable storage device 640, output devices 650, user input devices 660, a display system 670, and peripheral devices 680.

The components shown in FIG. 6 are depicted as being connected via a single bus 690. The components may be connected through one or more data transport means. Processor 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor 610. Mass storage device 630 may store the system software for implementing embodiments of the present technology for purposes of loading that software into main memory 620.

Portable storage device 640 operates in conjunction with a portable nonvolatile storage medium, such as a floppy disk, compact disk, digital video disc, or USB storage device, to input and output data and code to and from the computing system 600 of FIG. 6. The system software for implementing embodiments of the present technology may be stored on such a portable medium and input to the computing system 600 via the portable storage device 640.

User input devices 660 provide a portion of a user interface. User input devices 660 may include an alphanumeric keypad, such as a keyboard, for inputting alpha-numeric and other information, or a pointing device, such as a mouse, a trackball, stylus, or cursor direction keys. Additional user input devices 660 may comprise, but are not limited to, devices such as speech recognition systems, facial recognition systems, motion-based input systems, gesture-based systems, and so forth. For example, user input devices 660 may include a touchscreen. Additionally, the computing system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripherals device(s) 680 may include any type of computer support device to add additional functionality to the computer system. Peripheral device(s) 680 may include a modem or a router.

The components provided in the computing system 600 of FIG. 6 are those typically found in computer systems that may be suitable for use with embodiments of the present technology and are intended to represent a broad category of such computer components that are well known in the art. Thus, the computing system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac as, Palm as, Android, iOS (known as iPhone as before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
   transforming an object storage dump into an object store table by a table generator container, wherein the object storage dump includes at least objects within an object store that are marked for deletion;
   transmitting records for objects from the object store table to reducer containers, such that each reducer container receives object records for at least one object, the object records comprising all object records for the at least one object, wherein a record includes an object that is collected as garbage only if the record has passed a grace period established for the object store;
   generating a set of cleanup tasks by the reducer containers by each reducer container sorting the records for an object such that the objects are placed in ranked order according to time, evaluating the records in chronological order, and determining records that include objects that are collected as garbage; and
   executing the cleanup tasks by a cleanup agent.

2. A system, comprising:
   one or more processors; and
   logic encoded in one or more tangible media for execution by the one or more processors, the logic comprising:
      a table generator container that transforms an object storage dump into an object store table, wherein the object storage dump includes at least objects within an object store that are marked for deletion;
      a set of reducer containers that:
         receive records for objects from the object store table to reducer containers, such that each reducer container receives object records for at least one object, the object records comprising all object records for the at least one object, wherein a record includes an object that is collected as garbage only if the record has passed a grace period established for the object store;
         generate a set of cleanup tasks by each reducer container sorting the records for an object such that the objects are placed in ranked order according to time, evaluating the records in chronological order, and determining records that include objects that are collected as garbage; and
      a cleanup agent that executes the cleanup tasks.

3. A method, comprising:
   transforming an object storage dump into an object store table by a table generator container, wherein the object storage dump includes at least objects within an object store that are marked for deletion;
   transmitting records for objects from the object store table to reducer containers, such that each reducer container receives object records for at least one object, the object records comprising all object records for the at least one object, wherein records for an object are collected as garbage if the records for the object referenced in a log record have one or more later records that reference the object;
   generating a set of cleanup tasks by the reducer containers by each reducer container sorting the records for an object such that the objects are placed in ranked order according to time, evaluating the records in chronological order, and determining records that include objects that are collected as garbage; and
   executing the cleanup tasks by a cleanup agent.

4. The method according to claim 1, wherein objects marked for deletion are indexed in a log record that is stored on the object store.

5. The method according to claim 1, wherein a first field in each record to the object store table comprises an object identifier and a second field of the record comprises a time that the record was generated.

6. The method according to claim 1, wherein a cleanup agent is configured to download a cleanup task, locate objects referenced in the cleanup task, and delete the objects from the object store if the cleanup agent determines that the objects are deletable.

7. The system according to claim 2, wherein objects marked for deletion are indexed in a log record that is stored on the object store.

8. The system according to claim 2, wherein a first field in each record to the object store table comprises an object identifier and a second field of the record comprises a time that the record was generated.

9. The system according to claim 2, wherein the reducer containers generate a set of cleanup tasks in such a way that each reducer:
   sorts the records for an object so that the objects are placed in ranked order according to time; and
   walks the records in chronological order to determine records that are to be deleted.

10. The method according to claim 6, wherein the cleanup agent updates shards that comprise metadata that comprise any of ownership, size, free space, and combinations thereof, relative to a namespace that comprises the objects.

* * * * *